Figure 2:
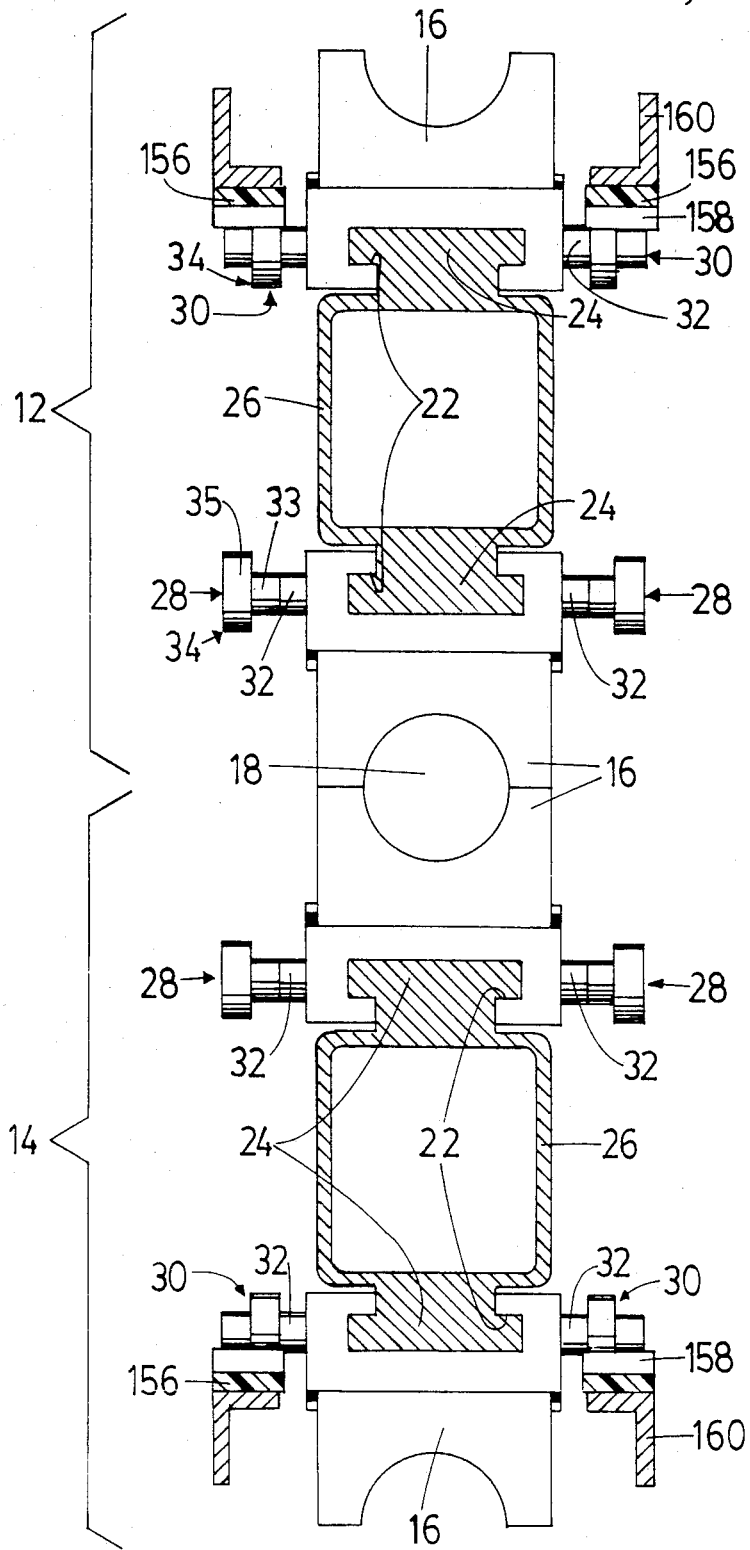

United States Patent [19]

Lupke et al.

[11] Patent Number: 4,504,206
[45] Date of Patent: Mar. 12, 1985

[54] CHAINLESS MOLD DRIVE FOR A CORRUGATOR OR THE LIKE

[76] Inventors: Manfred A. A. Lupke, 35 Ironshield Cresc.; Gerd P. H. Lupke, 46 Stornoway Cresc., both of Thornhill, Ontario, Canada

[21] Appl. No.: 457,285

[22] Filed: Jan. 12, 1983

Related U.S. Application Data

[63] Continuation-in-part of Ser. No. 341,556, Jan. 21, 1982, abandoned, which is a continuation-in-part of Ser. No. 186,625, Sep. 12, 1980, Pat. No. 4,325,685.

[51] Int. Cl.³ .................... B29D 23/03; B29D 23/04
[52] U.S. Cl. ............................ 425/326.1; 425/185; 425/186; 425/233; 425/532; 425/335; 425/336; 425/363; 425/369
[58] Field of Search ............... 264/508; 425/183, 185, 425/186, 532, 326.1, 325, 336, 369, 539, 233, 335, 363

[56] References Cited

U.S. PATENT DOCUMENTS

| | | | |
|---|---|---|---|
| 1,905,663 | 4/1983 | Wallace | 17/2 |
| 2,866,230 | 12/1958 | Holte | 18/19 |
| 3,243,850 | 4/1966 | Zieg | 18/19 |
| 3,286,305 | 11/1966 | Seckel | 18/19 |
| 3,430,292 | 3/1969 | Bauman et al. | 18/19 |
| 3,746,487 | 7/1973 | Andrews | 425/4 |
| 3,881,851 | 5/1975 | Allanic et al. | 425/113 |
| 3,981,663 | 9/1976 | Lupke | 425/326.1 |
| 4,021,178 | 5/1977 | Braun | 425/325 |
| 4,150,931 | 4/1979 | Gabrys | 425/186 |
| 4,325,685 | 4/1982 | Lupke et al. | 264/508 |
| 4,365,948 | 12/1982 | Chaplain | 425/417 |

FOREIGN PATENT DOCUMENTS

| | | |
|---|---|---|
| 1181392 | 11/1964 | Fed. Rep. of Germany . |
| 1176347 | 2/1972 | Fed. Rep. of Germany . |
| 2501044 | 7/1976 | Fed. Rep. of Germany . |
| 2832350 | 1/1980 | Fed. Rep. of Germany . |

*Primary Examiner*—Jan Silbaugh
*Assistant Examiner*—Hubert C. Lorin

[57] ABSTRACT

A vertical format corrugator or the like tube producing apparatus has two sets of independent mold sections that circulate on respective paths. The mold sections co-operate to define a travelling mold cavity into which a thermoplastic tube may be extruded to be molded. Fixed tracks extend along the forward and return runs of the mold section paths and are engaged by track followers on the mold sections. The track followers support and guide the mold section, thus enabling the elimination of chains linking the mold sections. In preferred embodiments, transfer mechanisms are provided at the ends of the runs to transfer the mold sections individually from one run to the next. The mold sections may include removable mold blocks, means for automatically changing the configuration of the mold cavity and a system for internal cooling of the mold sections.

1 Claim, 10 Drawing Figures

FIG. 1

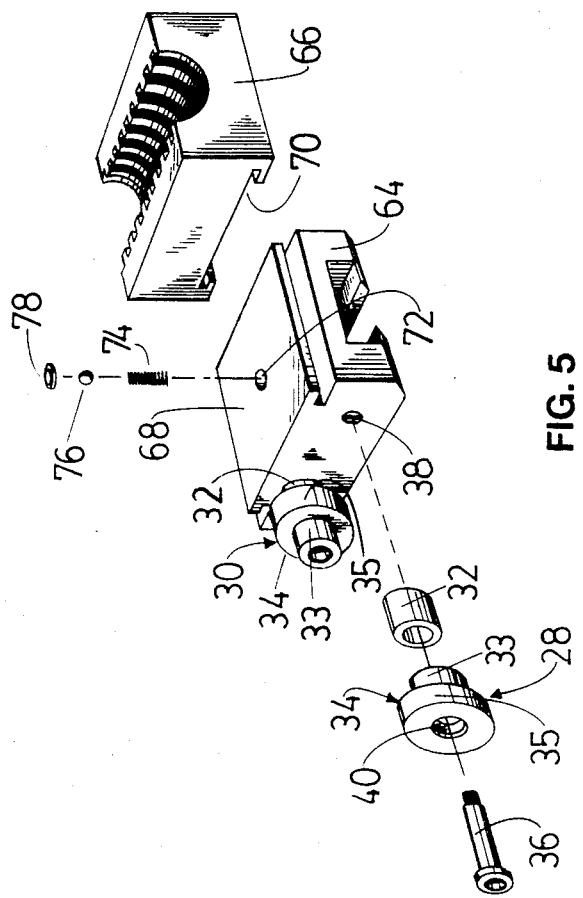

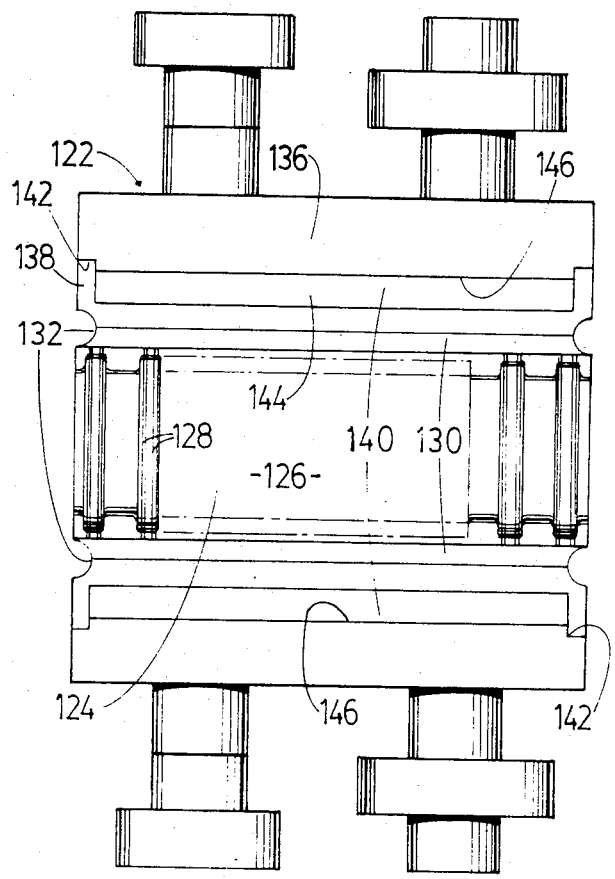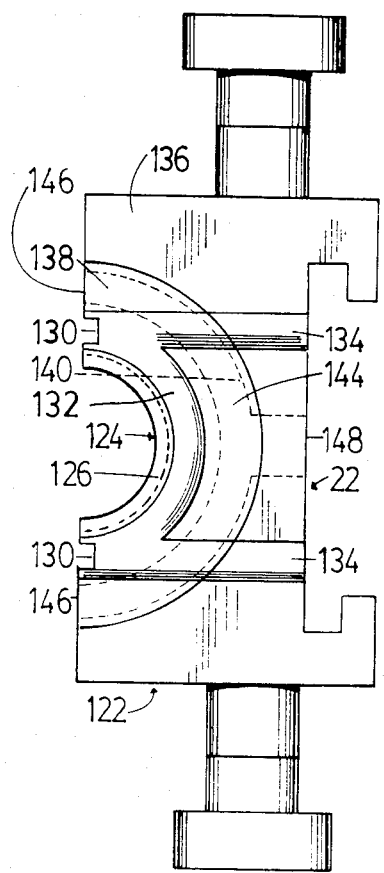
FIG. 9
FIG. 10

CHAINLESS MOLD DRIVE FOR A CORRUGATOR OR THE LIKE

This application is a continuation-in-part of application No. 341,556, filed Jan. 21, 1982, now abandoned, which is in turn a continuation-in-part of application No. 186,625, filed Sept. 12, 1980, now U.S. Pat. No. 4,325,685.

The present invention relates to a thermoplastic tube producing apparatus comprising two trains of mold sections and means for circulating the trains on respective vertically disposed circulation paths with the mold sections co-operating along a forward run of each path to define a mold cavity.

An apparatus of this type is known, for example, from Lupke U.S. Pat. No. 3,981,663, issued Sept. 21, 1976. In this apparatus, the mold sections in each train are linked by endless chains, which form part of the mold section driving and circulation system.

U.S. Pat. No. 4,325,685 discloses such an apparatus in which the mold sections have multiple half molds, and a cam track and follower system provides for lateral shifting of the mold sections to alter the profile of the molded tube.

U.S. patent application No. 341,556 discloses a rotor actuator system for laterally shifting the mold sections, a chainless mold drive and an internal mold cooling system.

The present invention relates to improvements in apparatus of this type.

According to the present invention the apparatus is characterized by independent mold sections, fixed tracks extending along the forward and return runs of the mold section paths, engaging means on each mold section for engaging the tracks so as to support and guide the mold sections as they travel along their forward and return runs, and means for pushing the mold sections along their forward and return runs.

The chains are thus eliminated, also eliminating any chain supports and related equipment. The installation and removal of mold sections is also made easier by the absence of chains.

In preferred embodiments, the tracks are undercut rails and the track engaging means are mating channels.

The fixed rails and channels may be constructed with minimal play and with a large contact area to avoid wear due to high bearing loads.

In preferred embodiments, the mold sections are individually transferred between the forward and return runs by transfer means that may include opposed rollers mounted on each mold section and sprockets at the end of each run for engaging the rollers to transfer the mold sections. Transfer tracks may be used to retain the rollers on the sprockets. The use of transfer means avoids jamming and wear at the ends of the forward and return runs.

The chainless drive allows the use of a quick-return system along the return run of each train of mold sections. With such a system, the total number of mold sections can be reduced considerably. One quick return system that may be employed is an endless belt extending along the return run so as to engage mold sections as they are transferred from the forward run and drive them along the return run track at a speed greater than the mold speed along the forward run.

Each mold section may comprise a carrier and a mold block removably mounted on the carrier. This provides for a simple exchange of mold blocks. The block and carrier may be connected by a key and keyway tranverse to the path of the mold sections and a spring loaded ball detent that prevents accidental misalignment.

The apparatus may be equipped with mold sections having plural half molds and mold section displacing means for selectively displacing the sections to bring each half mold into an operative position forming part of a mold cavity. The mold section displacing means may comprise two rotors on opposite sides of each mold section path and rotatable in synchronism with the circulation of the mold sections. Two sets of actuators are mounted on respective ones of the rotors for displacing the mold sections in opposite directions. In one embodiment, the rotors are mounted on the shaft of the sprockets for transferring the mold sections from the forward runs to the return runs of their path. The actuators may conveniently be electrically or pneumatically operated plungers.

Figure 3:
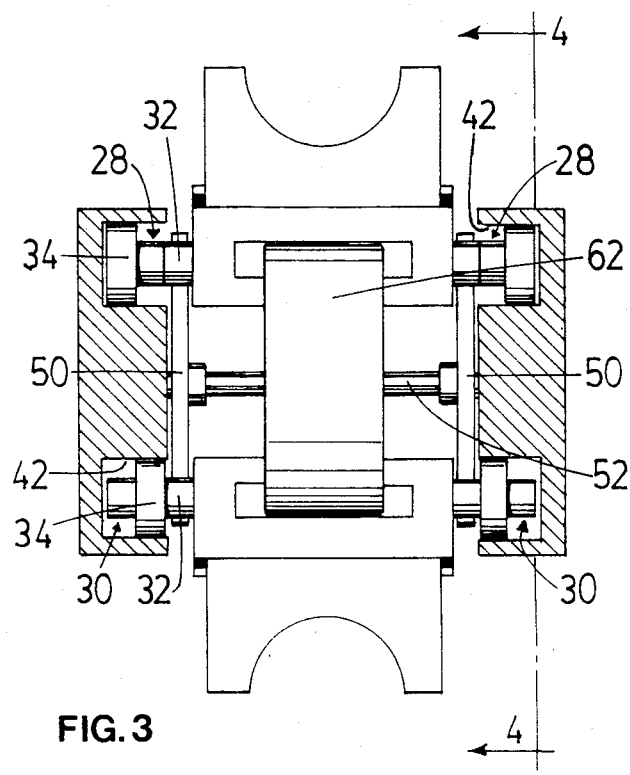
Figure 4:
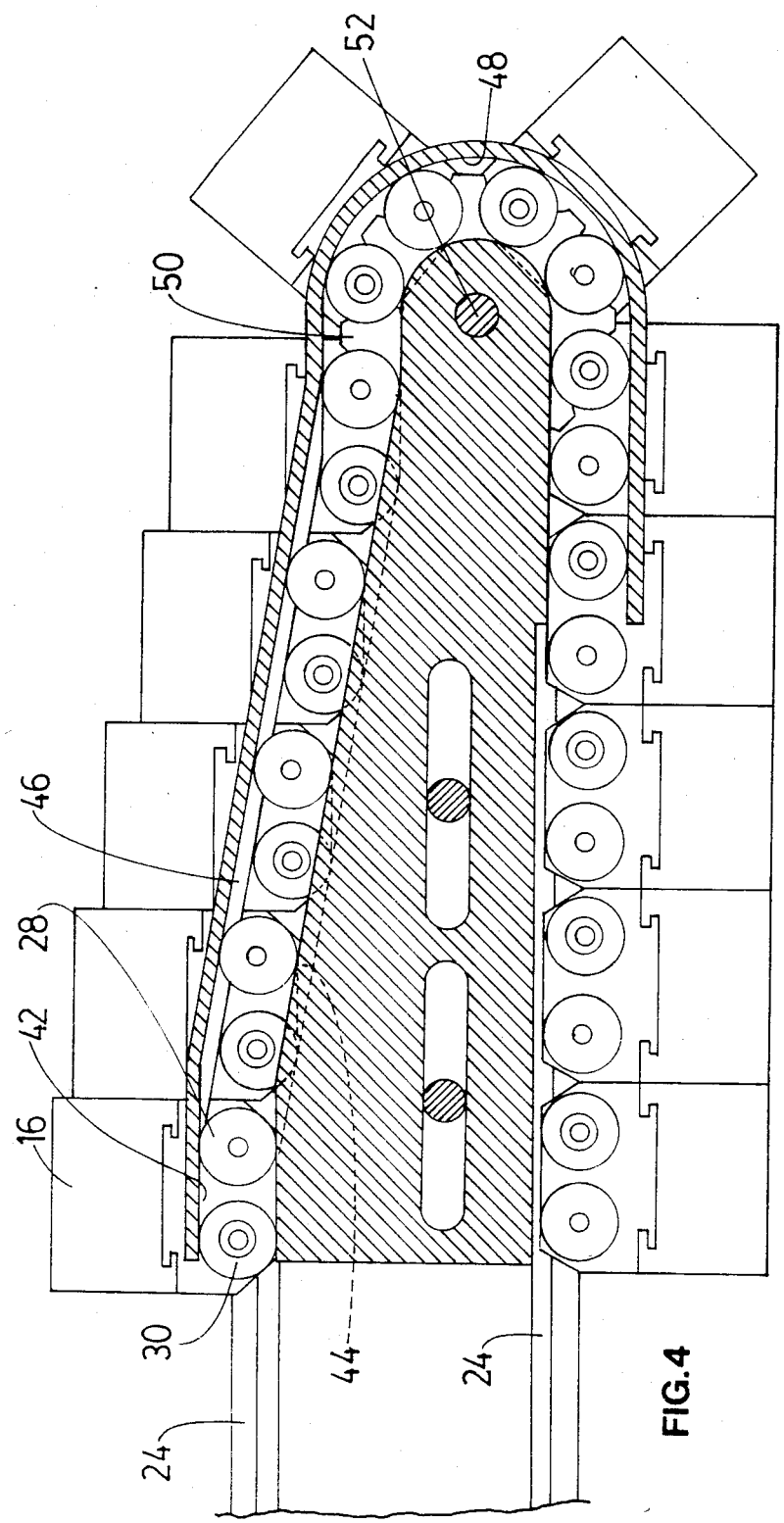
Figure 7:
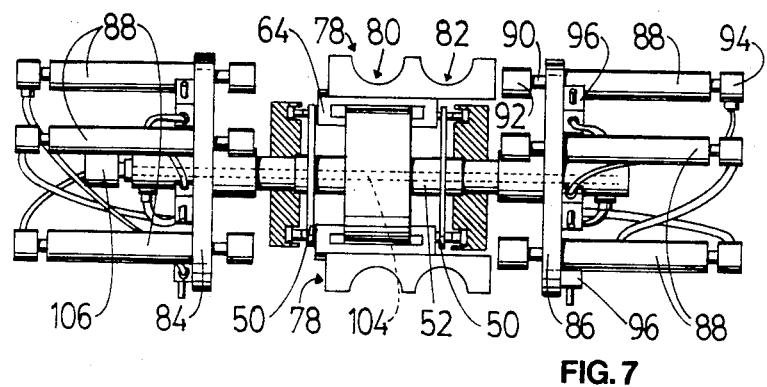
Figure 6:
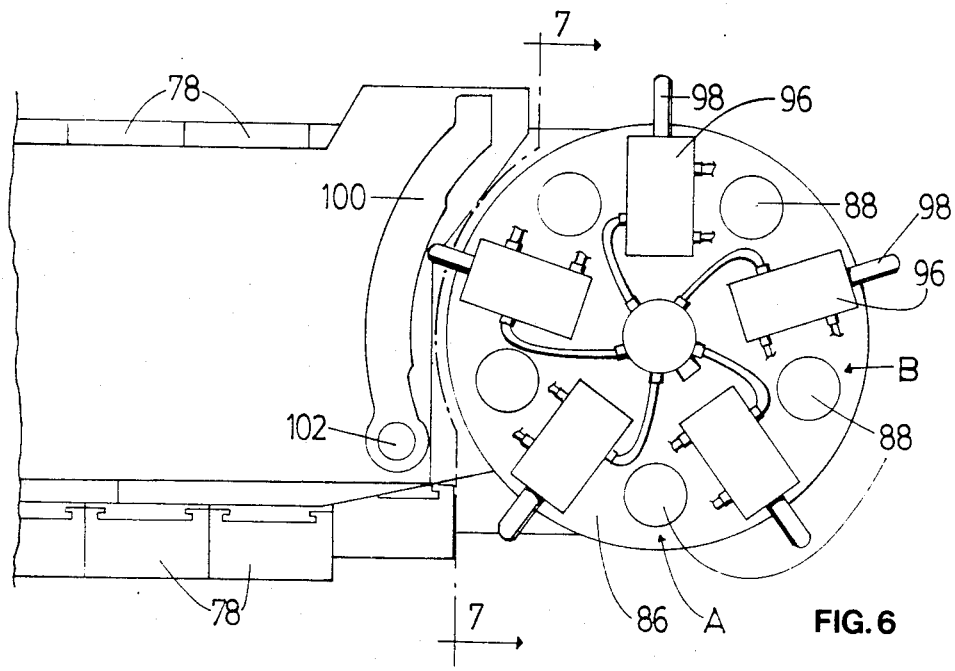
Figure 8:
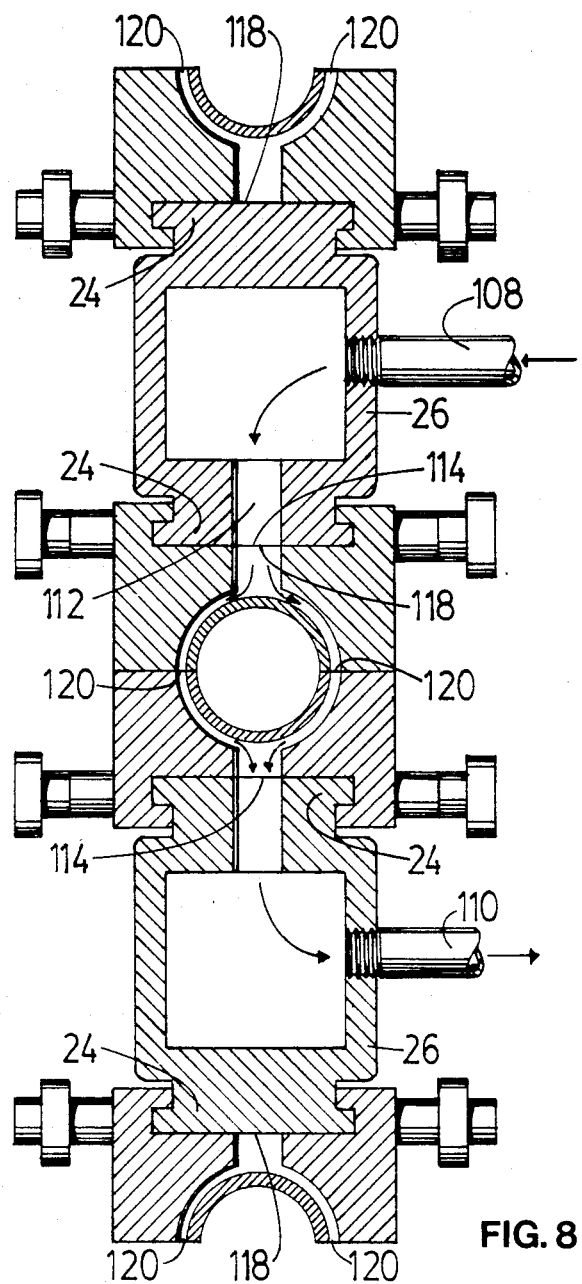

In the accompanying drawings, which illustrate exemplary embodiments of the present invention:

FIG. 1 is a side elevation of an apparatus for producing thermoplastic tube;
FIG. 2 is a section along line 2—2 of FIG. 1;
FIG. 3 is a section along line 3—3 of FIG. 1;
FIG. 4 is a section along line 4—4 of FIG. 3;
FIG. 5 is an exploded view of a mold section;
FIG. 6 is a partial side elevation of an alternative embodiment of the tube producing apparatus; and
FIG. 7 is a view along line 7—7 of FIG. 6.

Referring to the drawings, and most particularly to FIGS. 1 and 2, there is illustrated an apparatus 10 for producing thermoplastic tube. The apparatus illustrated is of the type known as a "corrugator" as it is frequently used to produce corrugated tube. The apparatus 10 includes two trains 12 and 14 of mold sections 16 that circulate on respective paths and that co-operate along a forward run to provide a travelling mold cavity 18. An extruder die 20 extrudes a tube of thermoplastic material into the mold cavity 18 where it is molded by blow or vacuum forming to provide the required tube.

The mold sections 16 are unconnected. That is, the mold sections are not linked to one another as by chains. As illustrated in FIG. 2, each mold section has an undercut channel 22 in its inner face. The channel mates with a complimentary undercut rail 24. The apparatus includes four such rails, running along the upper and lower sides of two beams 26 to define the forward and return runs of the two mold section paths. The channels 22 and rails 24 are a close fit so that the mold sections may slide along the rails while maintaining a fixed orientation with precision. The relatively wide rails and channels provide a large bearing surface, thus minimizing wear. The rails may be made of tool steel, and each channel may have a liner of similar material to ensure an indefinate lifetime for those parts.

To ensure proper transfer of each mold section between the forward and return runs of its path, the apparatus is equipped with a mold section guiding and transfer means at the end of each forward and return run. This is illustrated most particularly in FIGS. 2 through 5.

Each of the mold sections 16 carries a pair of leading rollers 28 and a pair of trailing rollers 30, with the rollers of each pair projecting from opposite sides of the mold section. As is most clearly shown in FIG. 5, each roller has an inner section 32 and an outer section 34 that are independently rotable on a cap screw 36 threaded into a bore 38 in the mold section. The head of the cap screw is recessed into a counterbore 40 in the outer roller section 34.

The inner sections 32 of all of the rollers 28 and 30 are identical. They may conveniently be chain rollers of an appropriate size. The outer section of each roller has a small end 33 of the same diameter as the inner roller section 32 and a large diameter end 35. The leading rollers 28 are assembled with the large ends outermost, and the trailing rollers 30 are assembled with the small ends outermost, as shown in FIGS. 2, 3 and 5.

As shown in FIGS. 3, 4 and 5, at the end of each forward run, the rollers 28 and 30 engage in transfer tracks 42 on either side of the apparatus. Just downstream of this engagement, the rail 24 ends, and each track 42 separates into an upstream inner section 44 and a downstream outer section 46, both of which slope away from the mold cavity 18. The two sections are parallel but horizontally offset. Track sections 44 are positioned inside the large ends 35 of the outer sections 34 of the leading rollers 28, so that as the mold sections travel downstream, the leading rollers travel downstream until they reach sections 46 and enter those sections at the same time that the large ends 35 of trailing rollers 30 enter the inner track sections 44. As the rollers of a mold section progress along the track sections 44 and 46, the mold section is drawn away from the formed tube without a change in its orientation relative to the tube. Where the mold sections have been fully withdrawn from the tube, the track sections 44 and 46 rejoin and guide the rollers through a curved track section 48 to the rail 24 of the return run.

As the rollers 28 and 30 enter the curved track section, they engage idler sprockets 50 carried on a shaft 52 on opposite sides of the mold section path. The mold sections are pushed from behind along their forward runs and as the leading rollers 28 of a mold section engage the sprockets 50, they act to rotate the sprockets, which in turn advance preceding mold sections around to the return run. As shown in FIG. 4, each mold section is out of engagement with the adjacent mold sections as it is transferred by the sprockets 50. As a mold section 16 leaves sprockets 50, it is pushed by the sprockets along the return run and in turn pushes the preceding mold section along that run.

As shown in FIG. 1, similar transfer means 10 are provided to transfer mold sections from the return runs to the upstream ends of the forward runs. The sprockets 54 of those transfer means are driven by motor 56 through a chain drive and synchronizing gears 60.

To ensure transverse alignment of the mold sections with the rails 24 (FIG. 2) as they leave the sprockets 50 or 54 (FIGS. 1, 3 and 4), a rotor 62 (FIG. 3) is mounted centrally between the sprockets of each pair to engage in the channel 22 (FIG. 2) of the mold sections.

Along each return run, between the downstream and upstream transfer means, the apparatus has a quick return drive for the mold sections. As shown in FIGS. 1 and 2, each quick return drive 150 includes a pair of upstream sheaves 152 on either side of the return run adjacent sprockets 54 and a pair of downstream sheaves 154 on opposite sides of the return run adjacent the downstream transfer means. The sheaves 152 and 154 on each side of the machine carry a belt 156 with cleats or teeth 158 along its outer face.

The sheaves are positioned so that the cleats 158 engage the rollers 28 and 30 along the return run of the mold sections. The belt is backed by a flange 160 mounted on the machine frame to prevent undesired deflection of the belt.

In operation, one of the pairs of sheaves 152 or 154 is driven to advance the mold sections along their return runs at a speed greater than the mold speed along the forward run. This spaces the mold sections along the return run, so that fewer mold sections are required than without the quick return system.

FIG. 5 llustrates the construction of a two-part mold section 16. The mold section includes a carrier 64 and a mold block 66. The carrier has a transverse key formation 68 on its outer face, while the mold block has a mating keyway 70. To retain the mold block in an operative position on the carrier the carrier is bored at 72 to receive a coil spring 74, a ball 76 and a ball retainer 78. In use, the ball projects slightly from the outer face of the key 68 to engage in a corresponding recess (not shown) in the base of keyway 70. The application of sufficient lateral force on the mold block will displace the ball 74 into the bore 72 against the force of the spring 74. This releases the mold block and allows its removal from the carrier.

FIGS. 6 and 7 illustrate an embodiment of the apparatus which has mold blocks 78 with two transversely speced half molds 80 and 82 that are of different configurations. For example, one may be corrugated and the other smooth. The mold block 78 may be displaced on the carrier 64 between two operative positions in which respective ones of the mold halves are in operative positions forming part of the mold cavity 18 (FIG. 1).

A mold block displacement means is provided to displace the mold blocks 78 between their operative positions. This includes two rotors 84 and 86 on opposite sides of each mold section path. The rotors are mounted on the sprocket shaft 52 for rotation with the sprockets 50. Each rotor carries a set of five actuators 88 with the actuators so arranged relative to the sprocket teeth that they are aligned laterally with the mold blocks as the mold blocks are transferred from their forward runs to their return runs.

Each actuator is a double acting pneumatic cylinder with its piston rod 90 parallel to the shaft 52 and extending through the associated rotor towards the mold blocks. A bumper 92 of protective material, for example rubber or plastics material, is mounted on the end of the piston rod.

The outer end of each cylinder is connected to a quick exhaust valve 94. The valve 94 and the outer end of the cylinder are connected to the respective outlet ports of a two-way valve 96 that is also mounted on the rotor. One valve 96 is provided for each of the cylinders 88. Each of the valves 96 is mounted so that its spindle 98 projects radially from the rotor. A valve actuating arm 100 is mounted on a pivot 102 adjacent the rotor and is movable between an operative position shown in FIG. 6, where it engages the valve spindles 98 as they rotate with the rotor and an inoperative position retracted to avoid that engagement. Engaging a spindle with the arm 100 actuates the valve to supply air under pressure to the outer end of the associated cylinder 88, thus to extend the piston rod of the cylinder to engage a mold block 78 confronted by the cylinder 88 and to displace the mold block laterally. On one rotor, the positioning of the valves 96 with respect to their associated cylinders 88, is such that the associated cylinder is pressurized to extend its piston rod when the cylinder passes the position designated A in FIG. 6. On the other rotor, the cylinder is pressurized to extend its piston rod when the cylinder passes the position designated B in FIG. 6.

To provide for selective operation of the cylinders, the arm 100 is normally biassed away from engagement with the spindles 98 and is connected to a solenoid (not shown) that projects the arm into its spindle engaging operative position.

To supply air to the valves 96 there is an air passage 104 along the centre of the shaft 52. The inlet of each valve is connected to the air passage and at one end of the shaft a rotary union 106 supplies air under pressure to the passage.

In operation, the arms 100 are displaced to their operative positions at selected times to operate selected valves 96 and their associated cylinders 88. When a cylinder 88 is operated, its piston rod 90 extends and engages the adjacent mold block 78 to shift the mold block to the operative position closest to the opposite side of the apparatus. Since the two half molds 80 and 82 of the mold block have different profiles, for example corrugated and smooth, appropriate selection of the mold block positions, yields a wide variety of different tube configurations that can be produced without stopping the machine to exchange mold blocks.

While certain embodiments of the invention have been described in detail, it is to be understood that other embodiments are possible within the scope of the present invention. For example, while the tracks and track engaging means have been described as being of T-shaped cross section, other cross sectional shapes are suitable. One example is a dovetail shape. It is also possible to use other forms of track, for example a channel. In the mold section guiding and transfer means, the outer roller sections may be of different lengths rather than diameters, with appropriately sized track sections.

In the quick return drive, the belts may be arranged other than outside of the return runs. They may, for example, be positioned beside the beams 26.

We claim:

1. A thermoplastic tube producing apparatus having a means defining a mold cavity comprising at least one train of mold sections including an endless train of circulating independent mold sections travelling in an endless path comprising a straight forward run wherein said sections co-operate to form a travelling mold for the thermoplastic tube, a return run, two semi-circumferential guide tracks for transferring said sections between said runs, track engaging means on each mold section for engaging said tracks so as to support and guide the sections along the tracks, said mold sections being provided with at least one pair of opposed rollers, in the center of said semi-circular tracks a rotatable transfer means being installed and including a pair of opposed sprockets mounted on a shaft and meshing with said pair of rollers to avoid jamming, high bearing loads and wear in said semi-circumferential guide tracks, characterized in that between said sprockets a rotor is mounted on said shaft and the mold sections are provided with a guide means operatively engaging with said rotor to ensure transverse alignment of the mold sections.

* * * * *